United States Patent [19]

Clark et al.

[11] Patent Number: 5,159,373
[45] Date of Patent: Oct. 27, 1992

[54] METHOD FOR LIGHT-SHIELDING A PHOTOSENSITIVE WEB END

[75] Inventors: William F. Clark, Honeoye Falls; Robert A. Huber, Churchville; Michael A. Evans, Rochester; Jaime I. Waldman, Hilton; Thomas C. Healey, Rochester, all of N.Y.

[73] Assignee: Eastman Kodak Company, Rochester, N.Y.

[21] Appl. No.: 738,710

[22] Filed: Jul. 31, 1991

[51] Int. Cl.$^5$ .............................................. G03B 17/26
[52] U.S. Cl. ........................................................... 354/275
[58] Field of Search ................. 354/275, 277; 430/501

[56] References Cited

U.S. PATENT DOCUMENTS

| | | | |
|---|---|---|---|
| 681,250 | 8/1901 | Niell | 354/275 |
| 778,403 | 12/1904 | Cline | 430/501 |
| 1,454,814 | 5/1923 | Jones | 430/501 |
| 1,454,815 | 5/1923 | Jones | 430/501 |
| 1,503,645 | 8/1924 | Faes | 430/501 |
| 4,455,076 | 6/1984 | Birkeland | 354/275 |

Primary Examiner—Michael L. Gellner
Attorney, Agent, or Firm—Clyde E. Bailey

[57] ABSTRACT

In use with a photosensitive web roll located inside a light-tight container having an exit slot through which the web is withdrawable, a flexible enclosure is provided for light-shielding a leading end portion of the web extending from the roll through the slot and outside the container. The enclosure comprises a flexible, substantially rectangular, opaque sleeve adapted to enclose the web end portion. The sleeve includes opposing top and bottom walls disposed in adjacent, registered, facing relationship and extending between front and rear ends and opposite lateral sides thereof. The walls are light-tightly joined together along their front ends and lateral sides, but are left unjoined and separable along their rear ends to provide an opening therebetween through which the web end portion can be inserted into the sleeve toward the joined front ends. The sleeve, with the web end portion so inserted, extends outwardly from within the container, through the exit slot, and thence outside the container, where it is folded back and secured against the container exterior.

10 Claims, 4 Drawing Sheets

METHOD FOR LIGHT-SHIELDING A PHOTOSENSITIVE WEB END

CROSS-REFERENCE TO RELATED APPLICATION

Reference is made to commonly assigned, copending, related U.S. patent application Ser. No. 738,709, filed concurrently herewith in the names of William F. Clark et al. and titled FLEXIBLE LIGHT-SHIELDING ENCLOSURE FOR PHOTOSENSITIVE WEB END.

BACKGROUND OF THE INVENTION

1. Field of the Invention

The present invention relates generally to light-shielding photosensitive material, and particularly to a method for light-shielding an end portion of photosensitive web material projecting from a light-tight container.

2. Description of the Prior Art

Photosensitive film rolls conventionally have been supplied to film-using apparatus, such as microfilmers, in roll-containing cartridges. The leading end of the outermost convolution of the film roll has been tape-spliced to the trailing end of a flexible opaque leader, which has then been wrapped around the roll, threaded through a cartridge exit slot, folded back, and then taped to the cartridge exterior. The leader, when so applied, has provided both a means for withdrawing the film end from the cartridge and a means for preventing light-piping into the cartridge. However, the added bulk of the film-to-leader splice has sometimes caused the splice to fail when pulled through the constricted exit slot, thereby causing the leader to become separated from the film end and the entire film roll to be lost inside the cartridge. In any event, even when the splice has not failed, and has pulled the film end out of the cartridge, the user has then removed the splicing tape and discarded the leader before threading the film end into the apparatus. For a standard 105 mm-wide (4.133 inches) film roll used with microfilmers, the typical acetate-based leader has been at least 760 mm (30 inches) long. Discarding such a leader in every instance has therefore entailed a significant amount of material waste.

Pertinent in the published prior art is U.S. Pat. No. 4,455,076 to Birkeland, which discloses a daylight-loadable cassette comprising a roll of photosensitive film that is wound upon a flanged spool with its leading end connected to a wider opaque leader, the leader being wrapped around the film in covering relation thereto, with its lateral edges angled radially outwardly and light-tightly against the opposing inward-facing surfaces of the spool flanges to protect the film from ambient light. While the cassette there disclosed may be satisfactory in some applications, it nonetheless poses the same drawbacks described above with reference to use of a spliced leader.

There has thus existed a persistent, long-felt, but unresolved need for a more efficient, reliable, and convenient alternative to the spliced-leader method of enabling film withdrawal from, and preventing light-piping into, a film-roll container.

SUMMARY OF THE INVENTION

The primary object of this invention has been to meet the foregoing need. That object and others have been achieved by the invention herein disclosed and claimed.

This invention finds utility in use with a photosensitive web roll that is rotatably mountable in a closable container having an exit slot through which photosensitive web from the roll is withdrawable. The invention is directed to a method for light-shielding a leading end portion of the photosensitive web that extends from the roll outwardly through and beyond the exit slot. This method comprises the steps of:

forming a flexible, substantially rectangular, opaque sleeve with top and bottom walls that lie in adjacent, registered, facing relationship and extend between front and rear ends and opposite lateral sides thereof, those walls being light-tightly joined together along their front ends and lateral sides but left unjoined and separable along their rear ends, thereby providing the sleeve with a closed leading end, closed lateral sides, and an open trailing end;

inserting the web leading end portion into the sleeve through its open trailing end and moving the inserted end portion longitudinally inside the sleeve toward its closed leading end to a position therein near its leading end;

mounting the roll in the container so that the sleeve, with the web end portion so positioned therein, extends outwardly from within the container through and beyond the exit slot; and closing the container;

whereby the web end portion extending outwardly beyond the exit slot is light-shielded by the sleeve.

This invention, and its objects and advantages, will become more apparent in the detailed description of its preferred embodiment presented hereinbelow.

BRIEF DESCRIPTION OF THE DRAWINGS

In the detailed description of the preferred embodiment of this invention presented below, reference is made to the accompanying drawings, wherein like reference characters denote like elements, and wherein.

DESCRIPTION OF THE PREFERRED EMBODIMENT

Because certain parts of, and methods of making, photosensitive web enclosures are well known, the following description is directed in particular to those elements and method steps forming, cooperating directly with, or relating to, this invention. Elements and steps not specifically shown or described herein are selectable from those known in the relevant art.

Figure 1:
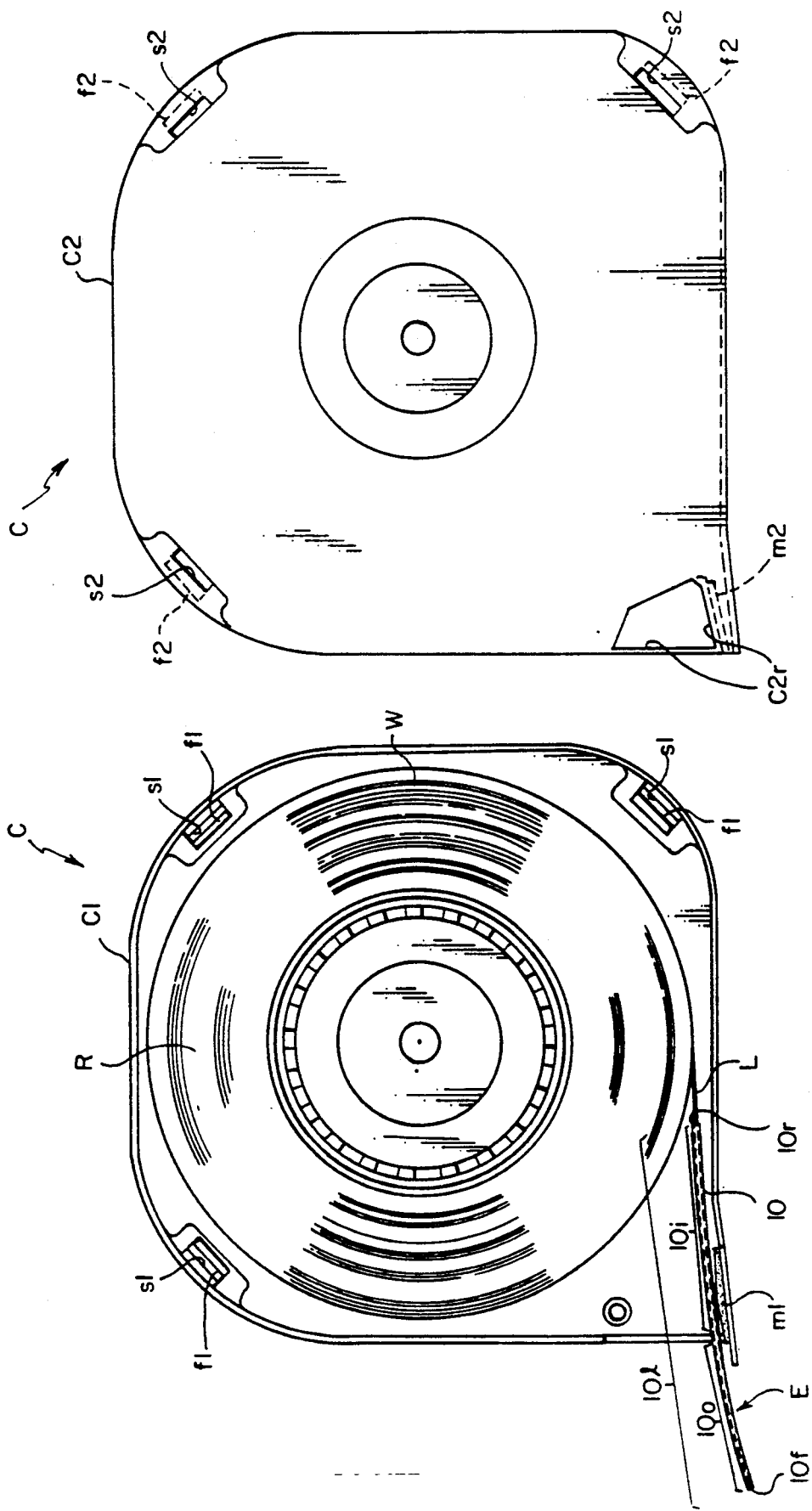
FIG. 1 is a side-elevation view of a photosensitive web roll as rotatably mounted in a cartridge, with half of the cartridge housing removed and shown to the right thereof, depicting a protective sleeve enclosing the web roll end and projecting outside the cartridge.

FIG. 1 illustrates a photosensitive web roll R that is rotatably mounted inside an open container or cartridge C comprising a pair of matable cartridge housing halves C1 and C2. Web roll R is depicted as mounted in housing half C1, the other housing half C2 being superposable over housing half C1 and tightly secured thereto by latch fingers f1 on housing half C1 engageable with matable slots s2 in housing half C2, and by corresponding latch fingers f2 on housing half C2 engageable with matable slots s1 in housing half C1. In the lower-left corners of housing halves C1 and C2 (as viewed in FIG. 1) are strips of soft, compliant, light-locking material m1 and m2, respectively, which extend transversely below and above, respectively, a web-withdrawal path leading from the web roll to a cartridge exit slot S (see FIG. 7) formed at the bottom of front wall F of the assembled cartridge C.

FIG. 1 shows a leading end portion L of the outermost convolution of photosensitive web W on roll R as it extends tangentially from the roll along the web-withdrawal path. To protect web W from ambient light outside the cartridge, its leading end portion L is sheathed in a flexible enclosure E. Enclosure E comprises a flexible, rectangular, opaque sleeve 10 specifically adapted to enclose the web end portion L.

Figure 2:
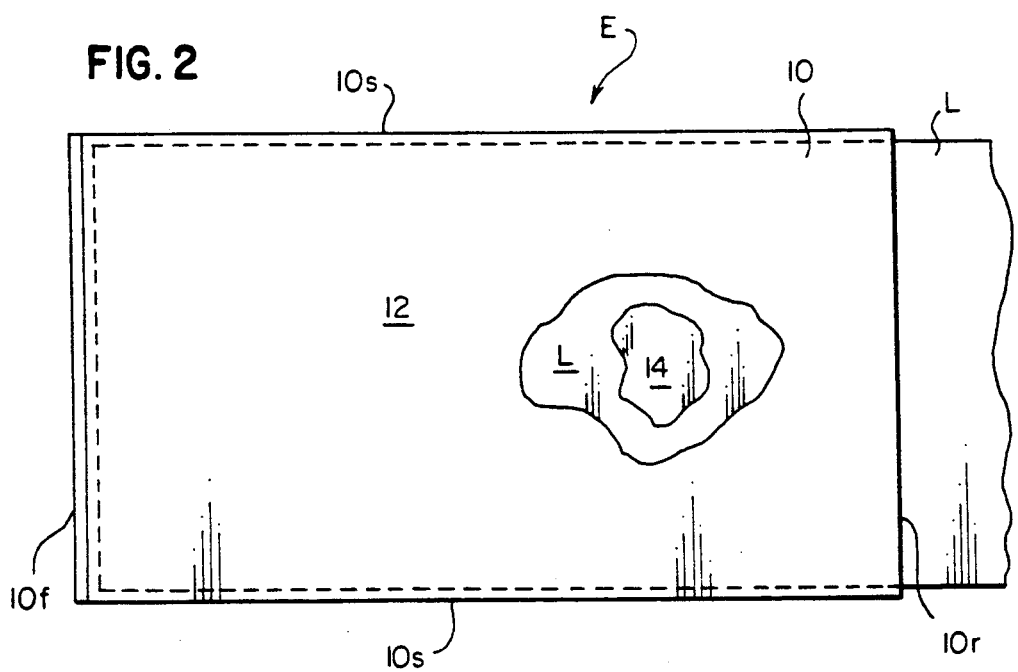
FIG. 2 is a top-plan view of the protective sleeve shown in FIG. 1, as adapted, in accordance with the preferred embodiment of this invention, to light-shieldingly enclose the otherwise exposed photosensitive web roll end.
Figure 3:
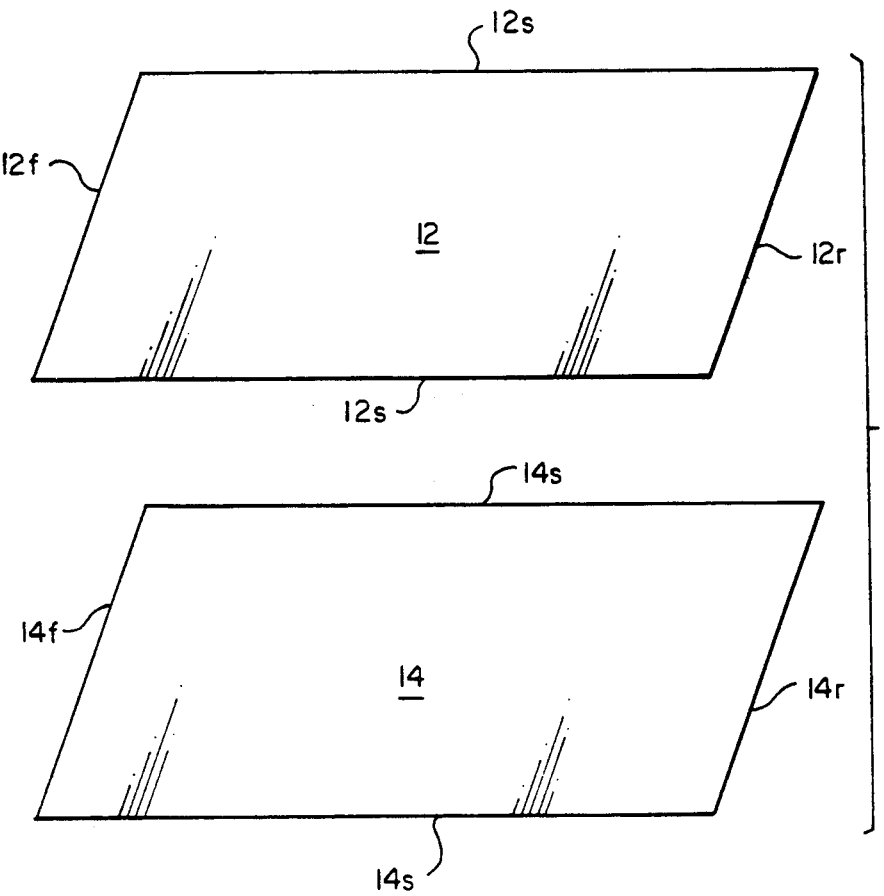
FIG. 3 is an exploded perspective view depicting opposing top and bottom wall portions of the protective sleeve of FIG. 2 as disposed in registered, facing relationship.

As illustrated in FIGS. 2 and 3, sleeve 10 has opposing top and bottom walls 12 and 14, respectively, disposed in adjacent, registered, facing relation to each other. Top wall 12 extends between front and rear ends 12f and 12r, respectively, and between opposite lateral sides 12s thereof. Bottom wall 14 similarly extends between front and rear ends 14f and 14r, respectively, and between opposite lateral sides 14s thereof. Walls 12 and 14 are light-tightly joined together along their front ends 12f, 14f and lateral sides 12s, 14s, but are left unjoined and separable along their rear ends 12r, 14r, thereby providing sleeve 10 with a closed front or leading end 10f, closed lateral sides 10s, and an open rear or trailing end 10r.

As indicated in FIG. 2, the web leading end portion L is inserted into sleeve 10 through its open trailing end 10r and is moved longitudinally inside the sleeve toward its closed leading end 10f to a position therein (shown in broken lines) near that end. The web roll R is then rotatably mounted in cartridge housing half C1 so that sleeve 10, with web end portion L so positioned therein, extends outwardly from within that housing half through and beyond the exit-slot location, as depicted in FIG. 1. Cartridge housing half C2 is then superposed upon and secured to housing half C1 as described above, thereby closing the cartridge with sleeve 10 projecting outwardly through exit slot S and light-shielding the enclosed web end portion L, as shown in FIG. 7.

When so disposed (see FIG. 1), sleeve 10 has rearward and forward portions 10i and 10o thereof respectively located inside and outside the cartridge. Rearward portion 10i extends from trailing end 10r, near roll R inside the cartridge, to the exit slot; forward portion 10o extends from the exit slot to leading end 10f outside the cartridge. Sleeve 10 thus has an overall length 10l, extending from trailing end 10r to leading end 10f, which comprises the sum of its rearward and forward portions 10i and 10o. Preferably, the rearward portion 10i is approximately one-half to two-thirds of the overall length 10l while the forward portion 10o is approximately one-half to one-third of the overall length 10l.

Figure 7:
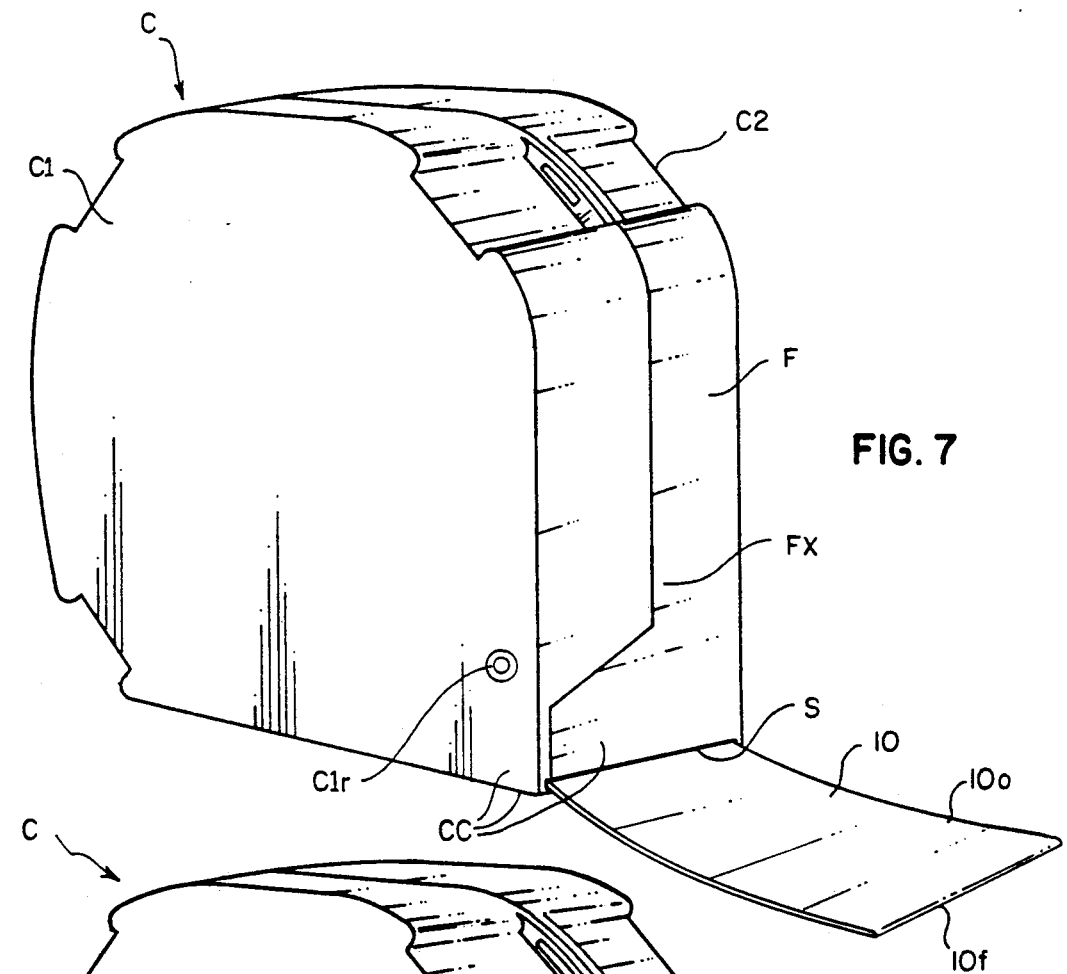
FIG. 7 is a perspective view of the cartridge of FIG. 1, with both halves of the cartridge housing fully assembled, showing the protective sleeve as enclosing the web roll end and projecting outside the cartridge through an exit slot therein.

To protect the outwardly projecting forward portion 10o during packaging, transport, storage, and handling, the forward portion is folded upwardly just outside exit slot S and rearwardly toward cartridge front wall F, and then secured to an exterior surface Fx of wall F (see FIG. 7). A convenient and effective way of doing that is to mount a triangular-shaped cover member C3 that is removably mountable on an exit-slot corner portion CC of the cartridge in close covering relation to slot S and surface Fx (see FIGS. 7 and 8).

Cover member C3 is made of flexible plastic, with an inwardly projecting boss b formed on one end wall thereof so as to mate with a corresponding recess C1r on one side of the cartridge corner portion CC, and with an inwardly protruding detent on the opposite end wall (not shown) engageable with a mating recess C2r (see FIG. 1) on the other side of corner portion CC.

Figure 8:
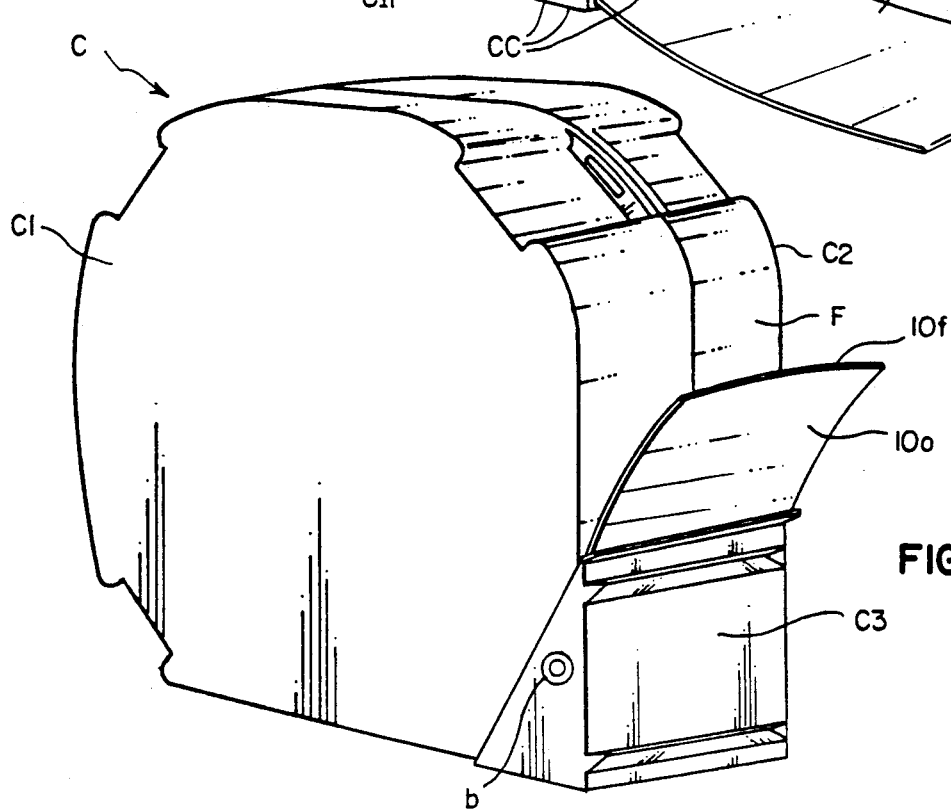
FIG. 8 is a perspective view similar to FIG. 7 but illustrating the protective sleeve as folded and held against the cartridge housing by a removable cover member.

From a position beneath the projecting sleeve portion 10o (as viewed in FIG. 7), cover member C3 is first moved upwardly and rearwardly toward corner portion CC, folding sleeve portion 10o in the process, and is then pushed onto the corner portion until its boss b and opposite detent engage the corner portion recesses C1r and C2r respectively, at which point the cover member is removably mounted on the cartridge corner portion in close covering relation to exit slot S and exterior surface Fx, thereby securing the folded sleeve portion 10o against surface Fx, as shown in FIG. 8.

To remove the cover member from the corner portion, its end walls are flexed laterally outward to disengage the boss and detent thereon, whereupon the cover member is simply pulled away. With the cover member removed, the projecting sleeve portion 10o can be grasped and sleeve 10 then withdrawn from the web end portion L therein, to render the web end portion accessible for its intended connection to cooperating apparatus.

Figure 4:
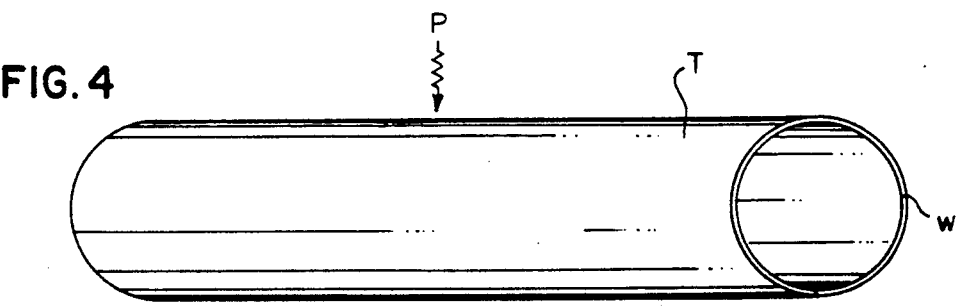
FIG. 4 is a perspective view of an elongate extruded-plastic tube from which the protective sleeve of FIG. 2 may be formed.
Figure 5:
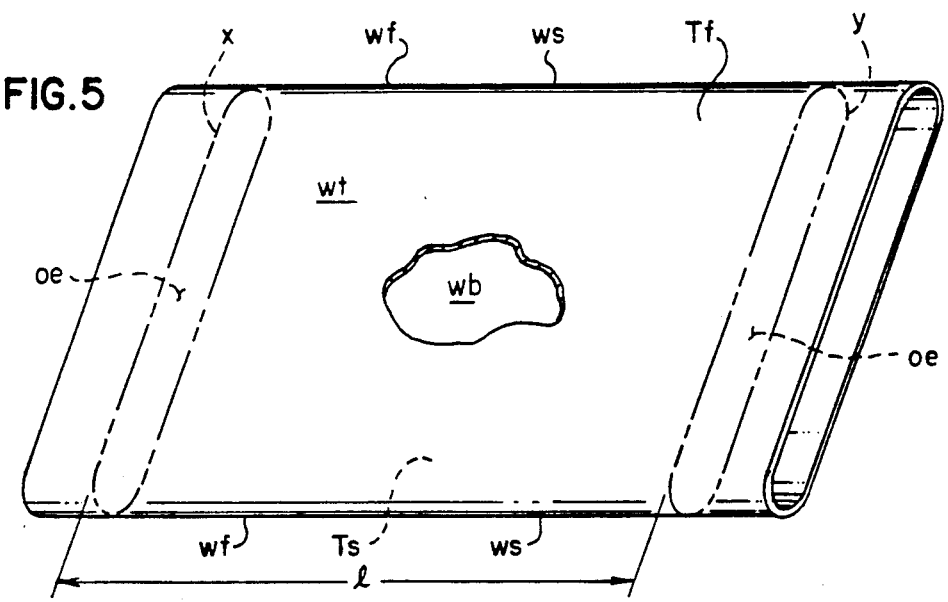
FIG. 5 is a perspective view of the tube shown in FIG. 4 after being flattened to form the sleeve of FIG. 2.
Figure 6:
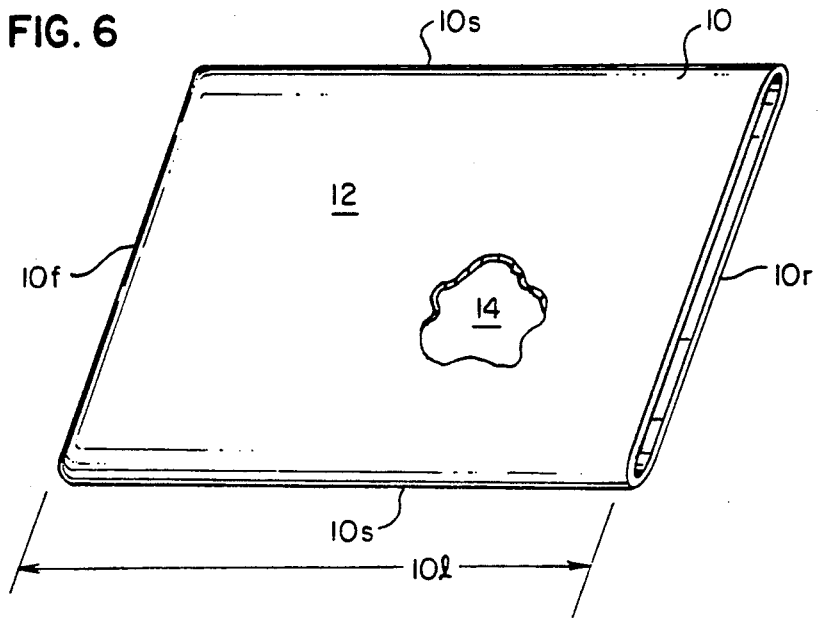
FIG. 6 is a perspective view of the flattened tube depicted in FIG. 5 after being cut to length and sealed at one end to thereby form the sleeve of FIG. 2.

The opposing top and bottom walls 12 and 14 of sleeve 10 are made of a thin, flexible, opaque, plastic sheet material such as black, linear, low-density polyethylene approximately 0.004 inches (0,102 mm) thick. With particular reference to FIGS. 4–6, an efficient way of forming sleeve 10 with such walls is to: (1) extrude an elongate tube T having a continuous, substantially cylindrical, thin, flexible wall w of opaque plastic, such as the above-described polyethylene; (2) flatten the tube T, as by application of a suitable compressive force P thereon, to provide a flattened tube Tf having substantially flat, closely facing top and bottom wall portions wt and wb, respectively, that are seamlessly joined by folds wf extending longitudinally along opposite lateral sides ws thereof; (3) cut the flattened tube Tf along longitudinally spaced lines x and y transverse to lateral sides ws to provide a substantially rectangular sleeve Ts of predetermined length l between opposite open ends oe thereof; seal one of the open ends oe closed to provide the aforementioned closed leading end 10f of sleeve 10; and leave the other open end oe open to provide the aforementioned open trailing end 10r of sleeve 10. The resulting sleeve 10 as formed by this method is depicted in FIG. 6.

For a standard 105 mm-wide (4.133 inches) film roll, sleeve 10 may satisfactorily be made about 107 mm (4.2 inches) wide and about 208 mm (8.2 inches) long. In this case, the aforementioned rearward portion 10i of sleeve length 10l would be about one-half to two-thirds of the 208 mm (8.2 inches) sleeve length, or about 104 mm (4.1 inches) to 139 mm (5.5 inches), while the aforementioned forward portion 10o of sleeve length 10l would be about one-half to one-third of the 208 mm (8.2 inches) sleeve length, or about 104 mm (4.1 inches) to 69 mm (2.7 inches).

Extensive testing of such a sleeve has proven that the aforementioned primary object of this invention has been met. The light-shielding sleeve efficiently provides both a convenient and reliable means for withdrawing a web end from its container and an effective means for preventing ambient light from piping back through the web end into the container, all with no risk of any splice failure causing loss of the web roll inside the container, and with a substantial reduction in the amount of material that must be discarded as waste or recycled.

Although the present invention has been described with particular reference to its preferred embodiment illustrated herein, it will be understood by those skilled in the art that variations and modifications thereof could be effected and still fall within the scope of this invention as defined by the claims thereto now set forth hereinbelow.

We claim:

1. For use with a photosensitive web roll rotatably mountable in a closable container having an exit slot through which photosensitive web from the roll is withdrawable, a method for light-shielding a leading end portion of the photosensitive web from the roll extending outwardly through and beyond the exit slot, said method comprising the steps of:

forming a flexible, substantially rectangular, opaque sleeve with top and bottom walls that lie in adjacent, registered, facing relationship and extend between front and rear ends and opposite lateral sides thereof, said walls being light-tightly joined together along their front ends and lateral sides but left unjoined and separable along their rear ends, thereby providing the sleeve with a closed leading end, closed lateral sides, and an open trailing end;

inserting the web leading end portion into the sleeve through said open trailing end thereof and moving the inserted end portion longitudinally inside the sleeve toward said closed leading end to a position therein near said leading end;

mounting the roll in said container so that the sleeve, with said web end portion in said position therein, extends outwardly from within said container through and beyond the exit slot; and closing said container;

whereby said web end portion extending outwardly beyond said exit slot is light-shielded by the sleeve.

2. The method claimed in claim 1 wherein said mounting step includes mounting the roll in said container so that the sleeve, with said web end portion therein, has rearward and forward portions thereof disposed within and without said container respectively, said rearward portion extending from said sleeve trailing end near the roll inside said container to said exit slot, said forward portion extending from said exit slot to said sleeve leading end outside said container.

3. The method claimed in claim 2 wherein said forming step includes providing the sleeve with an overall length extending between said leading and trailing ends thereof, and wherein said mounting step further includes mounting the roll in said container so that said sleeve rearward portion is approximately one-half to two-thirds of said overall length while said sleeve forward portion is approximately one-half to one-third of said overall length.

4. The method claimed in claim 2 further comprising the step of folding said sleeve forward portion back and securing it against an exterior surface of said container.

5. The method claimed in claim 4 further comprising the steps of:

providing a cover member that is removably mountable on said container in close covering relation to said exit slot and said exterior surface; and removably mounting said cover member on said container in said close covering relationship, thereby securing the folded-back sleeve forward portion against said exterior surface.

6. The method claimed in claim 1 wherein said forming step includes:

extruding an elongate tube having a continuous, substantially cylindrical, thin, flexible wall of opaque plastic;

flattening said tube to provide a flattened tube having substantially flat, closely facing top and bottom wall portions seamlessly joined by folds extending along opposite lateral sides thereof;

cutting the flattened tube transversely to said lateral sides to provide a substantially rectangular sleeve of predetermined length between opposite open ends thereof;

sealing one of said open ends closed to provide said closed leading end of the sleeve; and leaving the other of said open ends open to provide said open trailing end of the sleeve.

7. The method claimed in claim 6 wherein said tube wall is approximately 0.004 inches (0,102 mm) thick, and said opaque plastic includes black linear low-density polyethylene.

8. The method claimed in claim 1 wherein said forming step includes forming the sleeve with its top and bottom walls made of thin, flexible, opaque, plastic sheet material.

9. The method claimed in claim 8 wherein said sheet material is approximately 0.004 inches (0,102 mm) thick.

10. The method claimed in claim 8 wherein said sheet material includes black linear low-density polyethylene.

* * * * *